United States Patent
Eberle et al.

(10) Patent No.: US 8,770,648 B2
(45) Date of Patent: Jul. 8, 2014

(54) DEVICE FOR RECEIVING A CONTAINER FOR A CHARGING SOCKET IN A MOTOR VEHICLE

(71) Applicant: Dr. Ing. h.c.F Porsche Aktiengesellschaft, Stuttgart (DE)

(72) Inventors: Wilfried Eberle, Ehingen (DE); Ruediger Jahn, Schwieberdingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/826,152

(22) Filed: Mar. 14, 2013

(65) Prior Publication Data
US 2013/0257074 A1 Oct. 3, 2013

(30) Foreign Application Priority Data
Mar. 28, 2012 (DE) .......................... 10 2012 102 685

(51) Int. Cl.
*B62D 25/00* (2006.01)

(52) U.S. Cl.
USPC ....................................................... 296/97.22

(58) Field of Classification Search
USPC ............................ 296/97.22, 97.2, 1.06, 1.07
See application file for complete search history.

(56) References Cited

U.S. PATENT DOCUMENTS

| | | | | |
|---|---|---|---|---|
| 4,142,756 A * | 3/1979 | Henning et al. | ........... | 296/97.22 |
| 4,573,694 A * | 3/1986 | Goto et al. | ................... | 280/834 |
| 4,811,984 A * | 3/1989 | Hempel | ..................... | 296/97.22 |
| 5,090,760 A * | 2/1992 | Wheeler | ...................... | 296/1.06 |
| 5,118,155 A * | 6/1992 | Koop | ........................... | 296/1.06 |
| 5,165,749 A * | 11/1992 | Sheppard | .................. | 296/97.22 |
| 5,437,491 A * | 8/1995 | Nedbal et al. | .............. | 296/97.22 |
| 5,906,406 A * | 5/1999 | Pajakowski | ................ | 296/97.22 |
| 6,033,006 A | 3/2000 | Bovellan et al. | | |
| 6,435,233 B1 * | 8/2002 | Miura et al. | .................. | 141/390 |
| 6,508,501 B1 * | 1/2003 | Meinke | ...................... | 296/97.22 |
| 7,311,348 B1 * | 12/2007 | Bang | .......................... | 296/97.22 |
| 7,967,361 B2 * | 6/2011 | Scott et al. | ................... | 296/97.2 |
| 8,152,032 B2 * | 4/2012 | Tardif | .......................... | 222/498 |
| 8,215,333 B2 * | 7/2012 | Stokes et al. | .................. | 137/312 |
| 8,360,501 B2 * | 1/2013 | Zentner | ...................... | 296/97.22 |
| 8,556,326 B2 * | 10/2013 | Zentner | ...................... | 296/97.22 |
| 2004/0112770 A1 * | 6/2004 | Oswald | ........................ | 206/219 |

(Continued)

FOREIGN PATENT DOCUMENTS

DE 37 02 903 8/1988
DE 198 05 715 8/1998

(Continued)

OTHER PUBLICATIONS

German Office Action of Oct. 24, 2012.

*Primary Examiner* — Kiran B Patel
(74) *Attorney, Agent, or Firm* — Gerald E. Hespos; Michael J. Porco; Matthew T. Hespos

(57) ABSTRACT

A charging socket for a hybrid or electric vehicle is arranged in a container which is held in an opening in a body sheet of the vehicle body. A frame surrounds the opening on the inside of the body sheet. The frame is fixed to the body sheet and retains the container in a supported manner.

6 Claims, 5 Drawing Sheets

(56) References Cited

U.S. PATENT DOCUMENTS

| | | |
|---|---|---|
| 2005/0155671 A1* | 7/2005 | McClung et al. ............. 141/350 |
| 2006/0102583 A1* | 5/2006 | Baughman et al. ........... 215/216 |
| 2007/0046062 A1* | 3/2007 | Yoshimura ................. 296/97.22 |
| 2009/0178411 A1* | 7/2009 | Henkle et al. ................... 60/739 |
| 2013/0049972 A1* | 2/2013 | Pusch et al. ................. 340/636.1 |
| 2013/0249486 A1* | 9/2013 | Eberle ........................... 320/109 |
| 2013/0257074 A1* | 10/2013 | Eberle et al. ................. 296/1.07 |

FOREIGN PATENT DOCUMENTS

| | | |
|---|---|---|
| DE | 299 16 065 | 6/2000 |
| DE | 10 2006 058 525 | 5/2008 |
| WO | 2011/104609 | 9/2011 |

* cited by examiner

DEVICE FOR RECEIVING A CONTAINER FOR A CHARGING SOCKET IN A MOTOR VEHICLE

CROSS REFERENCE TO RELATED APPLICATIONS

This application claims priority under 35 USC 119 to German Patent Appl. No. 10 2012 102 685.8 filed on Mar. 28, 2012, the entire disclosure of which is incorporated herein by reference.

BACKGROUND OF THE INVENTION

1. Field of the Invention

The invention relates to a device for receiving a container for a charging socket of a hybrid or electric vehicle.

2. Description of the Related Art

DE 299 16 065 discloses an adapter for the recessed installation of a tank closure for a vehicle. The adapter is in the form of a frame on the inside of a body sheet and an edge of the adapter surrounds an opening in the body sheet. DE 37 02 903 A1 discloses a cup that is inserted into a body opening in a vehicle. The cup is connected on the inside to the body and receives a tank filler neck that is retained in a base wall of the cup-shaped component via elastic sealing elements.

An object of the invention to provide a device for receiving a container for a charging socket of a hybrid or electric vehicle, so that the device can be fit and installed in a simple manner in an opening in a body wall.

SUMMARY OF THE INVENTION

The invention comprises an opening incorporated into the body sheet of a vehicle so that a container for a charging socket is insertable. The body opening is surrounded by an internal frame with a bearing flange having an encircling retaining limb that is offset inwardly and is connectable to an encircling collar bent away from the opening edge. The retaining limb has a fastening flange bent away therefrom. The fastening flange projects into the body opening and the container is retained on the fastening flange in a manner supported all the way around via a flange on the container.

The encircling collar of the opening edge in the body sheet preferably has a conically converging wall. The retaining limb has a corresponding, conically converging wall that engages over the wall of the collar and clamps the wall of the collar from the outside.

The wall of the retaining limb preferably is connected to the wall of the collar via one or more welds, soldered joints or adhesive bonds. This design combined with the arrangement of the frame on the inside of the body opening and with a positional fixing relative to the body opening and a fixed connection to the opening edge in the body sheet enables the container for the charging socket to be inserted from the outside in a simple manner of installation and the frame can be placed from the inside onto the collar and connected. The bearing flange may additionally be adhesively bonded to the body sheet, and the body sheet may be provided with a grooved receptacle for a seal.

The fastening flange of the frame projects into the body opening in the body sheet and preferably has recesses that extend from the inner edge of the fastening flange to the wall of the retaining limb to provide accessibility to the connection between the annular retaining flange of the frame and the collar corresponding thereto on the opening edge of the body sheet. Thus, the collar can be connected to the retaining flange from the interior in a simple manner by means of the weld, solder joint or adhesive bond.

The container, which is inserted through the body opening from the outside, is connected to the frame. Additionally, the encircling flange of the container rests on top of the fastening flange in a fastening position and is fixable in a clamping manner on the fastening flange of the frame via a plurality of clips provided in the circumference of the container. The clips achieve a releasable connection and, in a fastening position of the container, securely clamp the encircling flange of the container on the fastening flange of the frame by means of the clips or similar fastening means.

The outwardly offset encircling flange of the container preferably has an elastic seal positioned on the wall of the collar to seal the opening in the body sheet all the way around. Said seal results in a clearly delimited sealing of the body opening.

The container is arranged in the opening in the body sheet and has an opening in the base for receiving the charging socket, which is retained in a sealed manner via an encircling elastic seal. The charging socket is supported on the vehicle body and is connectable to a stationary mains supply via a charging cable.

An exemplary embodiment of the invention is illustrated in the drawings and described in more detail below.

DETAILED DESCRIPTION OF THE PREFERRED EMBODIMENTS

Figure 1:
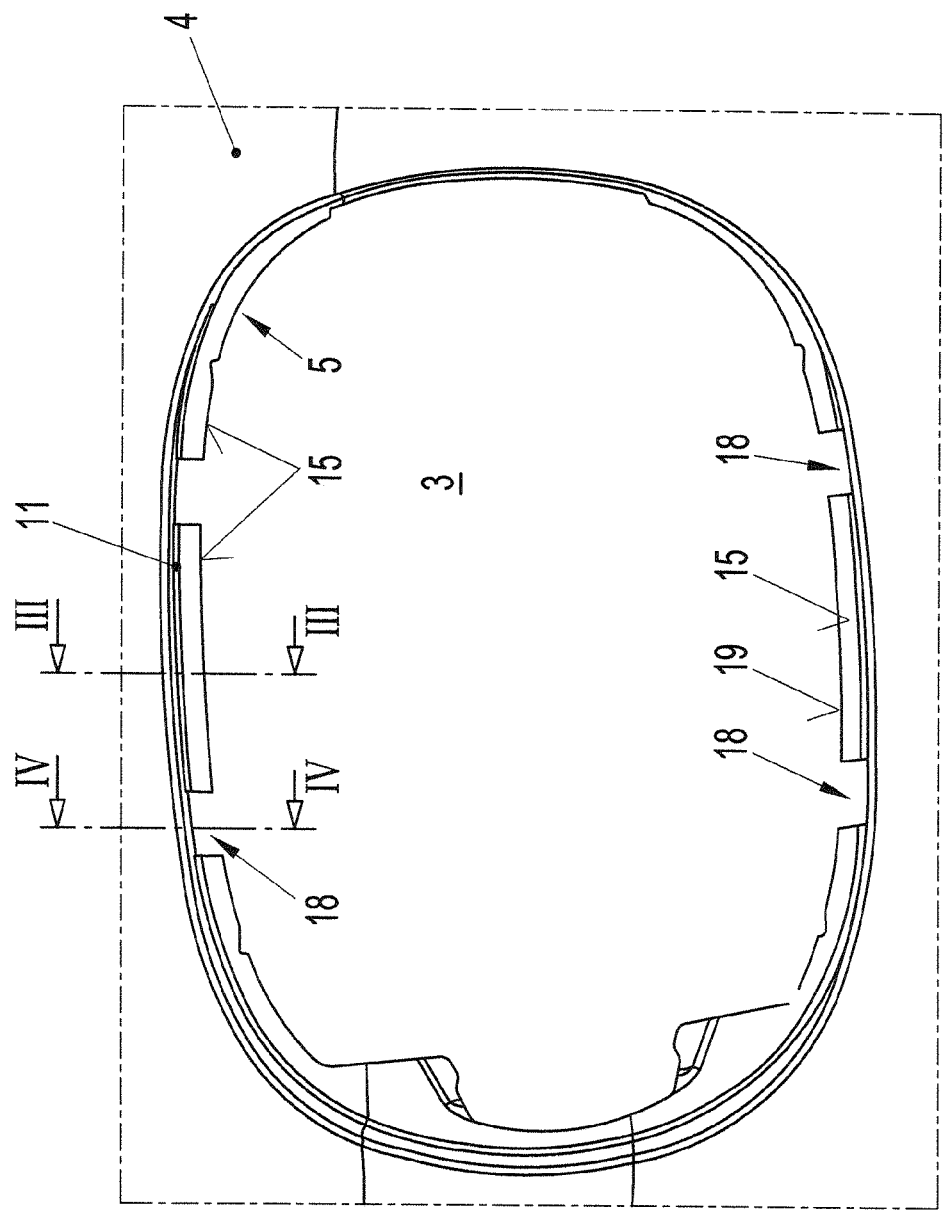
FIG. 1 is an external view of a frame, which is inserted in a body opening in a vehicle, for fixing a container for a power socket.
Figure 2:
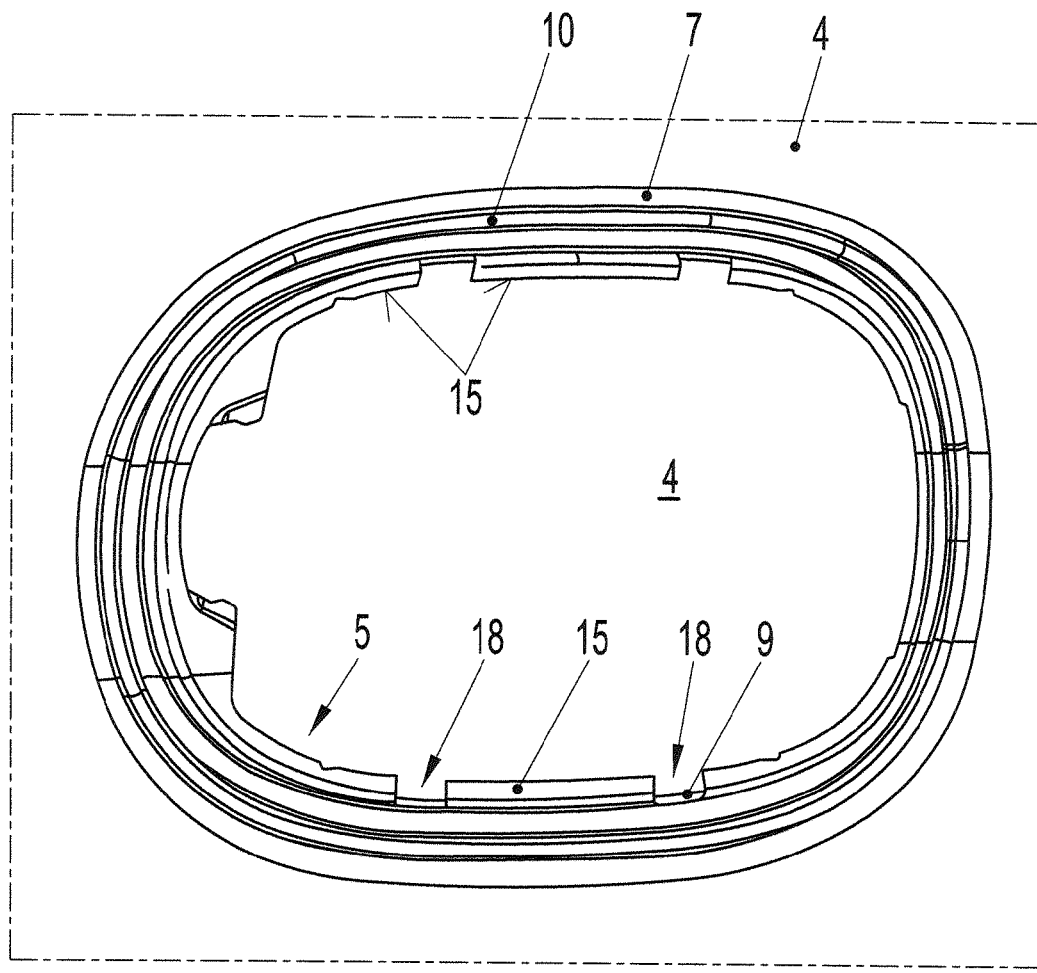
FIG. 2 is an interior view of the frame, which is inserted into the body opening in the vehicle, according to FIG. 1.

A device for receiving a container 1 for a charging socket 2 in an opening 3 in a body sheet 4 in the vehicle body substantially comprises an interior and encircling frame 5 with respect to the body opening 3.

The frame 5 has a bearing flange 7 that bears against or is spaced apart from an inner surface 6 of the body sheet 4 and has an inwardly offset, encircling retaining limb 8 with a wall 9. The bearing flange 7 has a groove 10. The flange 7 can be bonded adhesively to the body sheet 4, and a sealing ring can be arranged in the groove 10.

The encircling wall 9 of the retaining limb 8 is connectable to an encircling wall 12 of a collar 14 of the frame 5, which encircling wall 12 is bent away from the opening edge 11 in the body sheet 4. The retaining limb 8 has an encircling fastening flange 15 that projects into the body opening 3. The flange 15 is offset from the bearing flange 7 and the container 1 is retained on the flange 15 and is supported via a flange 16 on the container.

The collar 14 of the opening edge 11 in the body sheet 4 has a conically converging wall 12 that conforms to a correspondingly conically tapering wall 9 of the retaining limb 8 of the frame 5. The conical wall 9 enables the retaining limb 8 to be fixed on and clamped around the collar 14. A fastening can be undertaken by means of a weld 17, a soldered joint or an adhesive bond.

Figure 4:
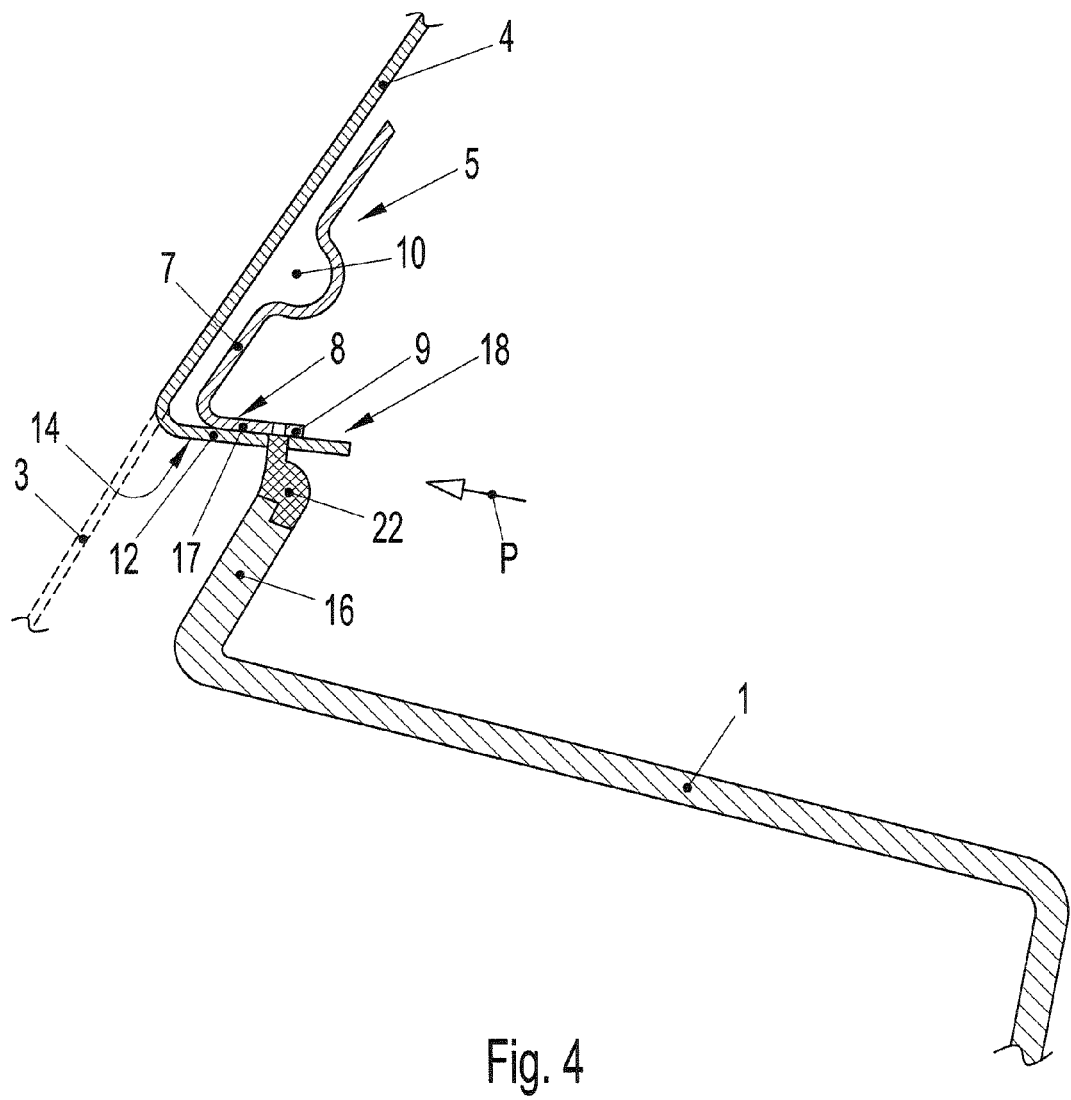
FIG. 4 is a section on the line VI-IV according to FIG. 1, with the container also illustrated.

The fastening flange 15 of the frame 5 has a plurality of recesses 18 which extend from the inner edge 19 of the fastening flange 15 as far as the wall 9 of the retaining limb 8, which is illustrated in detail in FIGS. 1 and 4. Accessibility with tools or the like from the inside—as seen in the arrow direction P—to the components 8 and 14 to be connected is optimally possible by means of said provided recesses 18.

Figure 5:
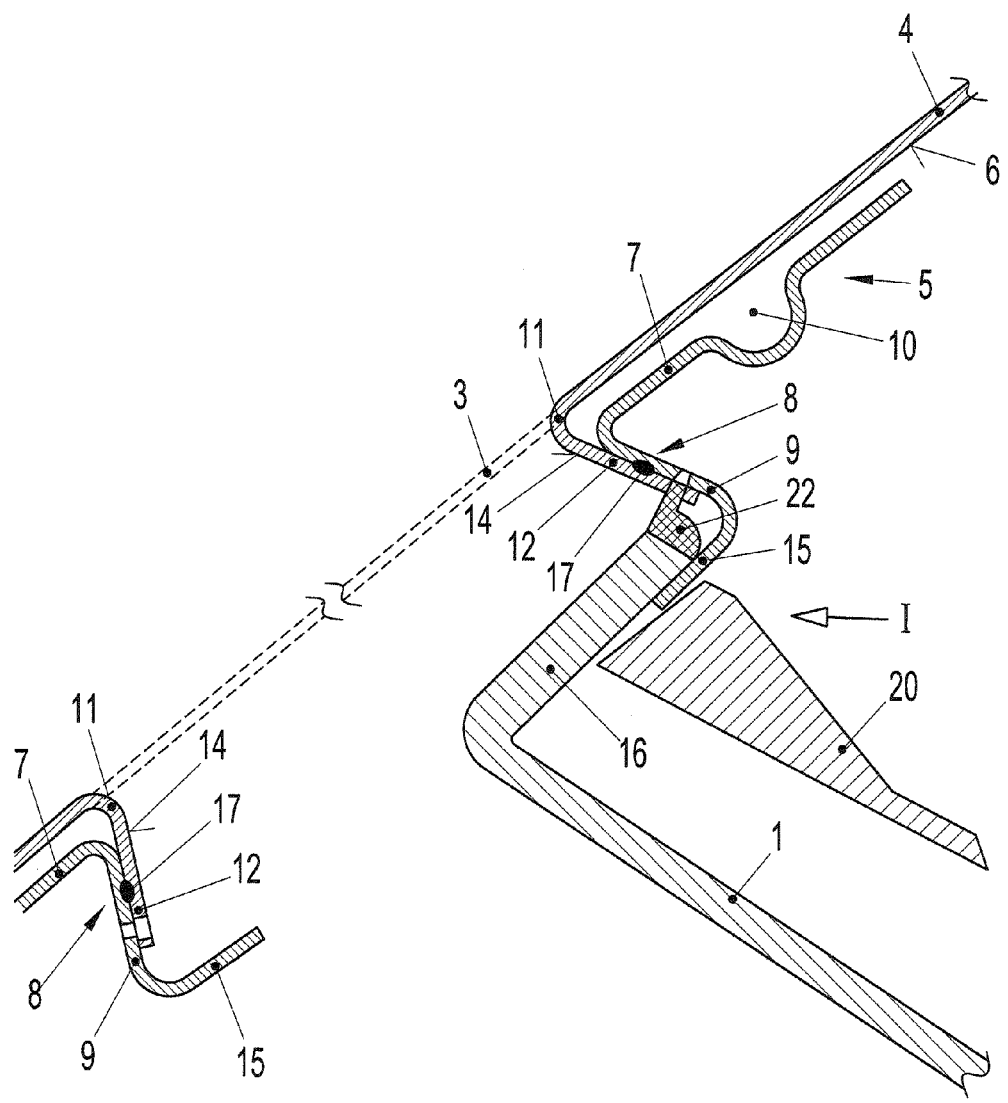
FIG. 5 is a section corresponding to FIG. 3 with a clip for fixing the container to the frame.

The container 1 is inserted into the body opening 3 from the outside, and the outwardly bent flange 16 on the container is supported on the fastening flange 15 of the frame 5. Clips 20 are used to fasten the container 1 to the fastening flange 15 of the frame 5. The clips 20 brace the flange 16 on the container against the fastening flange 15 of the frame 5, as illustrated schematically in FIG. 5.

An elastic seal 22 is placed on the outer edge 21 of the flange 16 on the container. More particularly, the elastic seal is positioned in an encircling manner on the wall 12 of the collar 14 on the opening side and neatly seals the opening 3 in the body sheet 4 all the way around.

Figure 3:
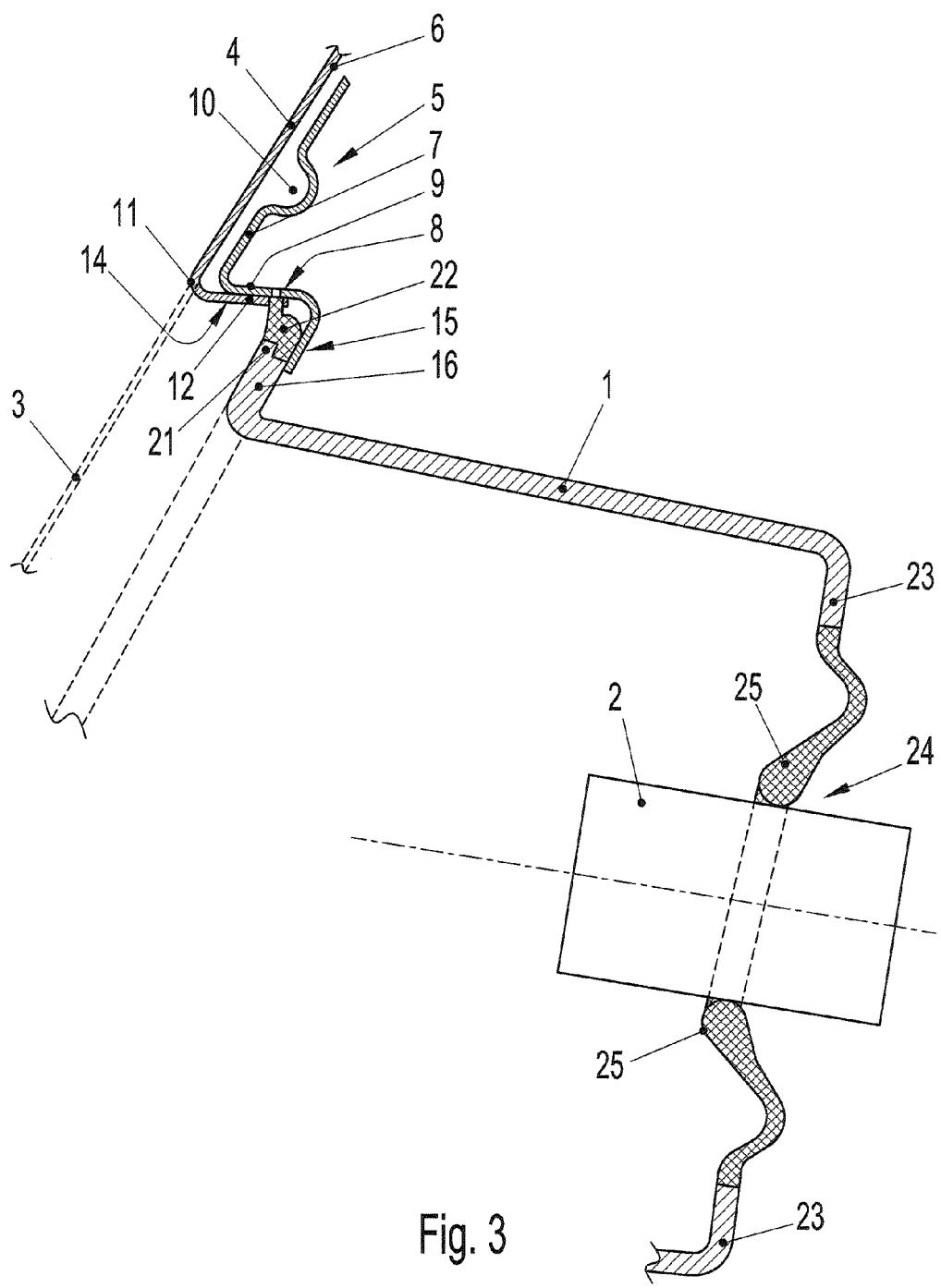
FIG. 3 is a section on the line III-III according to FIG. 1 through the frame surrounding the body opening on the inside, with the container and the charging socket shown in FIG. 3, but not in FIG. 2.

As shown in more detail in FIG. 3, the charging socket 2 is arranged in the base 23 of the container 1 in an opening 24 and is retained via an encircling elastic seal 25. The container 1 is sealed outwardly via a flap that is retained pivotably on the frame 5.

What is claimed is:

1. A hybrid or electric vehicle comprising:
   a body sheet having an opening with an opening edge;
   an internal frame surrounding the opening in the body sheet, the internal frame having a bearing flange bearing against an inner surface of the body sheet and having a collar with an encircling wall bent away from the opening edge in the body sheet;
   an encircling retaining limb having an encircling wall connected to the encircling wall of the collar and further having a fastening flange projecting into the opening; and
   a container for a charging socket of the hybrid or electric vehicle, the container being positioned in the opening and having a flange retained on and supported by the fastening flange of the retaining limb.

2. The vehicle of claim 1, wherein the bearing flange has a groove, the vehicle further comprising a sealing ring arranged in the groove.

3. The vehicle of claim 1, wherein the flange is bonded to the body sheet.

4. The vehicle of claim 1, wherein the encircling collar of the opening edge has a conically converging wall and the retaining limb has a conically converging wall that engages over and clamps the wall of the collar.

5. The vehicle of claim 1, further comprising clips fastening the flange on the container to the fastening flange of the frame in a fastening position.

6. The vehicle of claim 1, further comprising an elastic seal arranged on an outer edge of the flange on the container, the seal being positioned in an encircling manner on the wall of the collar and sealing the opening in the body sheet all the way around.

* * * * *